United States Patent
Fan et al.

(10) Patent No.: US 11,089,275 B2
(45) Date of Patent: Aug. 10, 2021

(54) ILLUMINATION SYSTEM, PROJECTION APPARATUS AND ILLUMINATION CONTROL METHOD

(71) Applicant: Coretronic Corporation, Hsin-Chu (TW)

(72) Inventors: Chen-Wei Fan, Hsin-Chu (TW); Ming-Tsung Weng, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 23 days.

(21) Appl. No.: 16/826,297

(22) Filed: Mar. 23, 2020

(65) Prior Publication Data
US 2020/0314396 A1  Oct. 1, 2020

(30) Foreign Application Priority Data
Mar. 26, 2019 (CN) .......................... 201910231535.2

(51) Int. Cl.
*G03B 21/20* (2006.01)
*H04N 9/31* (2006.01)

(52) U.S. Cl.
CPC ......... *H04N 9/3161* (2013.01); *G03B 21/204* (2013.01); *G03B 21/2033* (2013.01); *H04N 9/3152* (2013.01)

(58) Field of Classification Search
CPC .... G03B 21/008; G03B 21/28; G03B 21/145; G03B 21/204; G03B 21/206; G03B 21/208; G03B 21/2013; G03B 21/2033; G03B 21/2053; H04N 9/3114; H04N 9/3123; H04N 9/3152; H04N 9/3155; H04N 9/3161; H04N 9/3164; H04N 9/3182; H04N 9/3197
See application file for complete search history.

(56) References Cited

U.S. PATENT DOCUMENTS

| | | | |
|---|---|---|---|
| 2018/0059523 A1 | 3/2018 | Takagi | |
| 2018/0081263 A1* | 3/2018 | Ogawa | G03B 21/2053 |
| 2018/0259838 A1* | 9/2018 | Wu | G03B 21/2053 |

FOREIGN PATENT DOCUMENTS

| | | |
|---|---|---|
| CN | 102193296 | 9/2011 |
| CN | 103189794 | 7/2013 |
| CN | 108663879 | 10/2018 |

* cited by examiner

*Primary Examiner* — Sultan Chowdhury
(74) *Attorney, Agent, or Firm* — JCIPRNET

(57) ABSTRACT

An illumination system including a laser light source module, a wavelength conversion module and a control module is provided. The laser light source module simultaneously emits a first and second laser light beams, where a peak wavelength of the first laser light beam is greater than that of the second laser light beam. The control module is connected to the laser light source module and the wavelength conversion module, respectively. In a first time interval, the control module controls an amount of luminous flux of the first laser light beam to be greater than an amount of luminous flux of the second laser light beam. In a second time interval, the control module controls the amount of luminous flux of the first laser light beam to be smaller than the amount of luminous flux of the second laser light beam. A projection apparatus and an illumination control method are provided.

23 Claims, 11 Drawing Sheets

ILLUMINATION SYSTEM, PROJECTION APPARATUS AND ILLUMINATION CONTROL METHOD

CROSS-REFERENCE TO RELATED APPLICATION

This application claims the priority benefit of China application serial no. 201910231535.2, filed on Mar. 26, 2019. The entirety of the above-mentioned patent application is hereby incorporated by reference herein and made a part of this specification.

BACKGROUND

Technical Field

The invention relates to an optical system, an optical device containing the above optical system and a control method, and particularly relates to an illumination system, a projection apparatus and an illumination control method.

Description of Related Art

Recently, projection apparatuses based on solid-state light sources such as Light-Emitting Diode (LED) and laser diode (LD) have gradually taken a place in the market. Generally, excitation lights provided from these solid-state light sources are converted by a wavelength conversion material on a wavelength conversion module in the projection apparatus to produce converted lights of different colors. In order to satisfy a demand in color performance, a filter module is disposed in an illumination system of the projection apparatus, and the converted lights on the wavelength conversion module are filtered to form predetermined color lights after passing through the filter module. The color lights are modulated into an image beam by a light valve, so that the projection apparatus projects the image beam onto a screen or a projection target.

In the known projection technique, one of the methods for generating red, blue and green lights is to emit light in a time sequence, i.e. to respectively emit the red, blue and green lights in different time periods. However, since a green light source is expensive, the green light is usually generated by exciting a phosphor powder through using the blue light with a short wavelength. However, since human eyes have a better sense for the blue light emitted by blue light sources with a long wavelength, the blue light sources with the long wavelength are usually used to provide the blue light, and these blue light sources are turned on in different time intervals. In this way, the blue light source with the short wavelength for exciting the phosphor powder and the blue light source with the long wavelength for providing the blue light have to be adopted simultaneously in the system. Therefore, a large amount of laser elements is used, which causes a high cost. Moreover, since the blue light with the long wavelength is unnecessary to excite the phosphor powder on a phosphor device, the blue light source with the short wavelength and the blue light source with the long wavelength may be located on different optical paths, so that the whole device requires a larger a space for a design of the optical paths.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system, which has a smaller volume and an output beam thereof has a good color performance.

The invention is directed to a projection apparatus, which has a smaller volume and an output beam thereof has a good color performance.

The invention is directed to an illumination control method, which is adapted to easily adjust an illumination beam, and a finally output image beam has a good color performance.

Other objects and advantages of the invention may be further illustrated by the technical features broadly embodied and described as follows.

In order to achieve one or a portion of or all of the objects or other objects, an embodiment of the invention provides an illumination system. The illumination system includes a laser light source module, a wavelength conversion module and a control module. The laser light source module is configured to simultaneously emit a first laser light beam and a second laser light beam, where a peak wavelength of the first laser light beam is greater than a peak wavelength of the second laser light beam. The wavelength conversion module is located on a transmission path of the first laser light beam and the second laser light beam, and has at least one wavelength conversion region and a reflection region. The control module is electrically connected to the laser light source module and the wavelength conversion module, respectively, wherein in a first time interval, the control module controls an amount of luminous flux of the first laser light beam to be greater than an amount of luminous flux of the second laser light beam, and in a second time interval, the control module controls the amount of luminous flux of the first laser light beam to be smaller than the amount of luminous flux of the second laser light beam, wherein the first time interval is a time interval when the reflection region of the wavelength conversion module is cut into the transmission path of the first laser light beam and the second laser light beam, and the second time interval is a time interval when the at least one wavelength conversion region of the wavelength conversion module is cut into the transmission path of the first laser light beam and the second laser light beam.

In order to achieve one or a portion of or all of the objects or other objects, an embodiment of the invention provides a projection apparatus. The projection apparatus includes the aforementioned illumination system, at least one light valve and a projection lens. The illumination system is configured to provide an illumination light beam. The light valve is located on a transmission path of the illumination light beam, and is configured to convert the illumination light beam into an image beam. The projection lens is located on a transmission path of the image beam, and is configured to project the image beam to form a projection beam.

In order to achieve one or a portion of or all of the objects or other objects, an embodiment of the invention provides an illumination control method, configured to control an illumination system of a projection apparatus. The illumination system includes a laser light source module and a wavelength conversion module, and the wavelength conversion module has at least one wavelength conversion region and a reflection region. The illumination control method includes following steps. The laser light source module simultaneously emits a first laser light beam and a second laser light beam, wherein the wavelength conversion module is located on a transmission path of the first laser light beam and the second laser light beam, and a peak wavelength of the first laser light beam is greater than a peak wavelength of the second laser light beam. In a first time interval, an amount of luminous flux of the first laser light beam is controlled to be greater than an amount of luminous flux of the second laser light beam, wherein the first time interval is a time interval when the reflection region of the wavelength conversion module is cut into the transmission path of the first laser light beam and the second laser light beam. In a second time interval, the amount of luminous flux of the first laser light beam is controlled to be smaller than the amount of luminous flux of the second laser light beam, wherein the second time interval is a time interval when the at least one wavelength conversion region of the wavelength conversion module is cut into the transmission path of the first laser light beam and the second laser light beam.

Based on the above description, the embodiments of the invention have at least one of following advantages or effects. In the embodiments of the invention, the illumination system of the projection apparatus controls a proportion of the amount of luminous flux of the first laser light beam and the amount of luminous flux of the second laser light beam in different time intervals, so that the illumination light beam has a good color performance. Moreover, in the embodiment, since a first laser element and a second laser element are simultaneously turned on to operate, they are both adapted to provide blue light or to excite the wavelength conversion material, thereby reducing a total number of the laser elements required for the illumination system, and reducing the cost. Moreover, since the total number of the laser elements is reduced, it avails heat dissipating of the projection apparatus. Moreover, since the first laser element and the second laser element are all disposed in the laser light source module, and has the same optical path, a design of the optical path is relatively simple, and an overall device size is also reduced. In addition, since the second laser light beam with the short wavelength is relatively purple in human vision, by mixing it with the first laser light beam with the long wavelength, a problem of blue light purple-biased is mitigated, so as to achieve a good color performance of the illumination beam. Moreover, the illumination control method of the embodiment of the invention is capable of easily adjusting the illumination light beam in the aforementioned illumination system and the projection apparatus, so as to control the amount of luminous flux of the first laser light beam and the amount of luminous flux of the second laser light beam in different time intervals, thereby achieving good color performance of the illumination beam.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
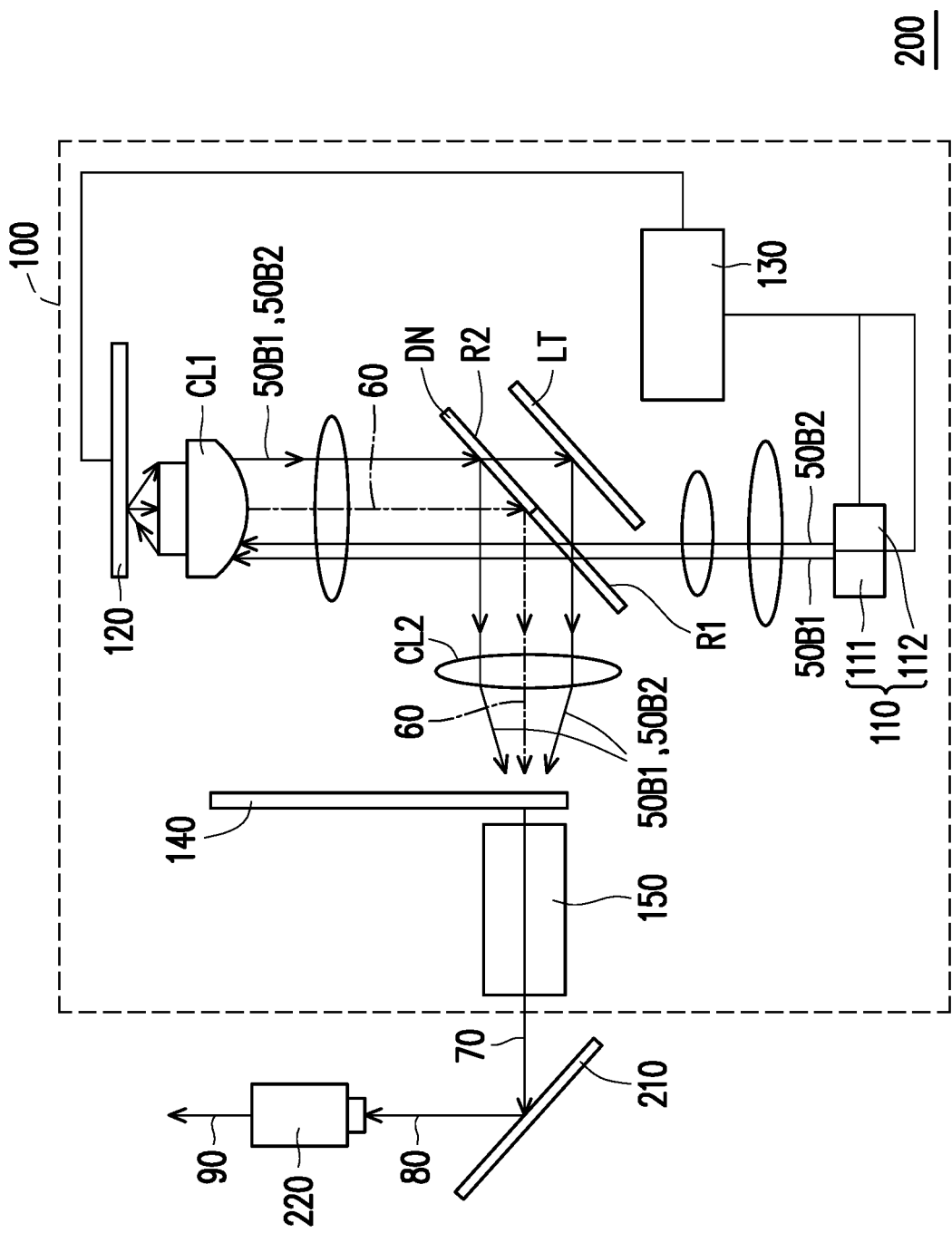
FIG. 1A is a schematic diagram of an optical framework of a projection apparatus according to an embodiment of the invention.
Figure 1B:
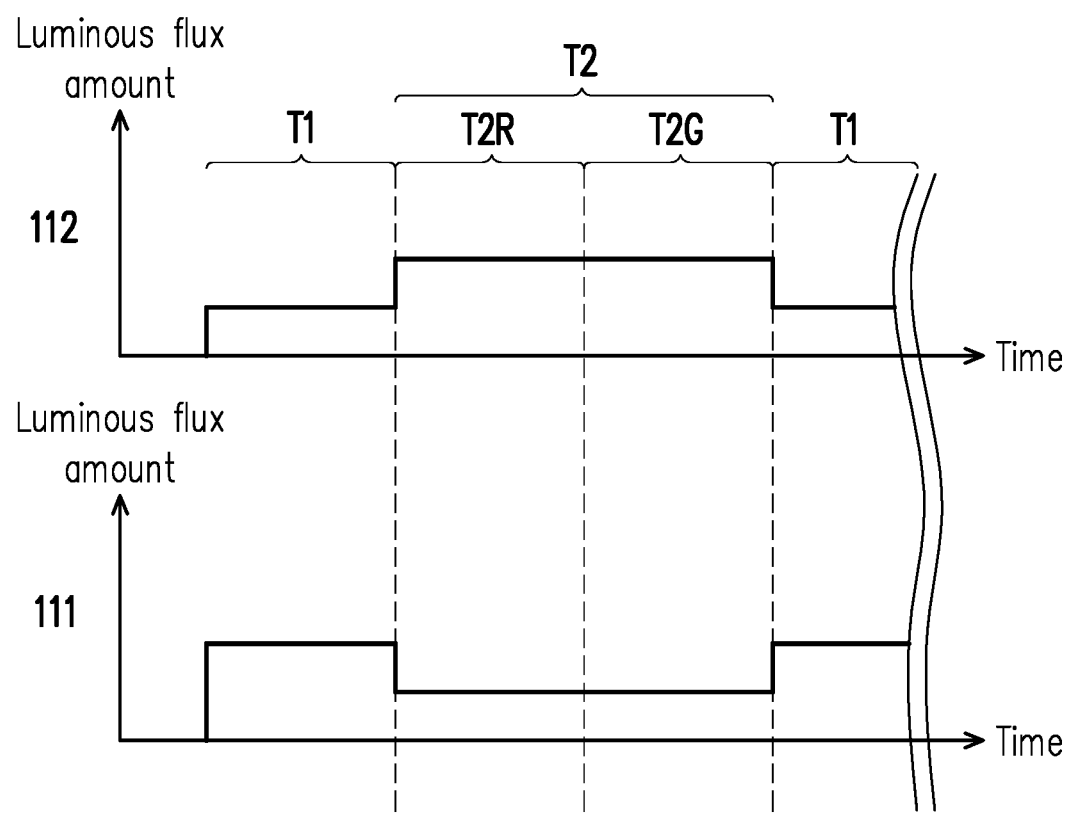
FIG. 1B is a timing schematic diagram of luminous flux amounts provided by a first laser light beam and a second laser light beam in different time intervals.
Figure 1C:
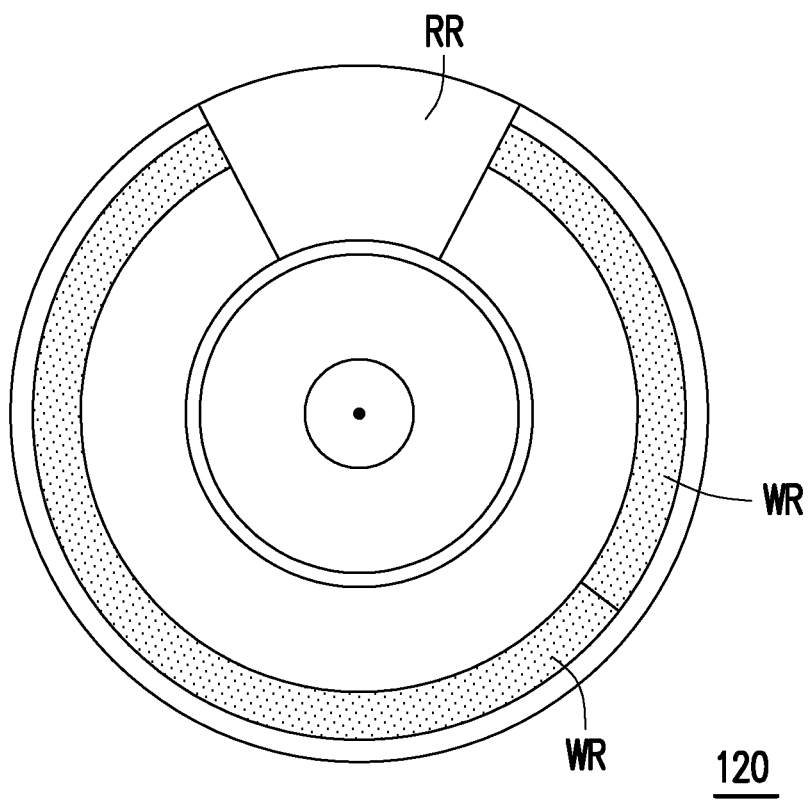
FIG. 1C is a top view of a wavelength conversion module of FIG. 1A.
Figure 1D:
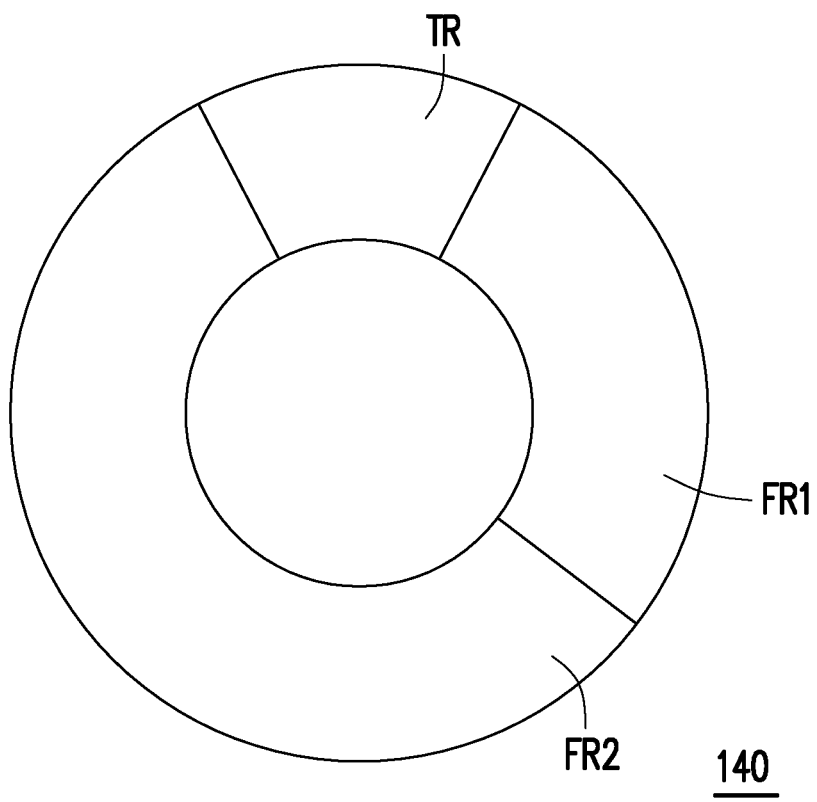
FIG. 1D is a top view of a filter module of FIG. 1A.

FIG. 1A is a schematic diagram of an optical framework of a projection apparatus according to an embodiment of the invention. FIG. 1B is a timing schematic diagram of luminous flux amounts provided by a first laser light beam and a second laser light beam in different time intervals. FIG. 1C is a top view of a wavelength conversion module of FIG. 1A. FIG. 1D is a top view of a filter module of FIG. 1A. Referring to FIG. 1, the projection apparatus 200 includes an illumination system 100, at least one light valve 210 and a projection lens 220. The illumination system 100 is configured to provide an illumination beam 70. In the embodiment, the number of the light valve 210 is one, but the invention is not limited thereto, and in other embodiments, the number of the light valves 210 may also be plural. Moreover, in the embodiment, the light valve 210 may be a Digital Micromirror Device (DMD) or a Liquid-Crystal-On-Silicon (LCOS) panel. However, in other embodiments, the light valve 210 may also be a transmissive liquid crystal panel or other light beam modulator.

To be specific, as shown in FIG. 1A, in the embodiment, the illumination system 100 includes a laser light source module 110, a wavelength conversion module 120, a control module 130, a first light-splitting element DN, a light converging lens CL1, a light transmitting element LT, a filter module 140 and a light homogenizing element 150. As shown in FIG. 1A, in the embodiment, the laser light source module 110 includes at least one first laser element 111 and at least one second laser element 112, which are adapted to simultaneously emit a first laser light beam 50B1 and a second laser light beam 50B2. The at least one first laser element 111 is configured to emit the first laser light beam 50B1, and the at least one second laser element 112 is configured to emit the second laser light beam 50B2. For example, in the embodiment, the at least one first laser element 111 and the at least one second laser element 112 may respectively include a plurality of blue laser diodes (not show) arranged in an array, but the invention is not limited thereto.

To be specific, in the embodiment, the first laser light beam 50B1 and the second laser light beam 50B2 are all blue laser light beams, but a peak wavelength of the first laser light beam 50B1 is greater than a peak wavelength of the second laser light beam 50B2. For example, in the embodiment, a waveband range of the first laser light beam 50B1 may be 455 nm to 470 nm, and a waveband range of the second laser light beam 50B2 may be 440 nm to 455 nm, and a difference between the peak wavelength of the first laser light beam 50B1 and the peak wavelength of the second laser light beam 50B2 is smaller than 30 nm.

Further, as shown in FIG. 1A, in the embodiment, the first light-splitting element DN is located between the laser light source module 110 and the wavelength conversion module 120, and the first light-splitting element DN has a first region R1 and a second region R2. For example, in the embodiment, the first region R1 of the first light-splitting element DN allows the blue light beam to penetrate through, but provides a reflection function to light beams of other colors (for example, red, green, yellow, etc.). Namely, the first region R1 of the first light-splitting element DN allows the first laser light beam 50B1 and the second laser light beam 50B2 with the blue color to penetrate through. In this way, the first laser light beam 50B1 and the second laser light beam 50B2 simultaneously emitted from the laser light source module 110 are transmitted to the first light-splitting element DN along a same direction, and are simultaneously transmitted to the wavelength conversion module 120 through the first region R1 of the first light-splitting element DN.

As shown in FIG. 1A, in the embodiment, the wavelength conversion module 120 is located on a transmission path of the first laser light beam 50B1 and the second laser light beam 50B2, and the light converting lens CL1 is located between the first light-splitting element DN and the wavelength conversion module 120. As shown in FIG. 1A and FIG. 1C, in the embodiment, the wavelength conversion module 120 has at least one wavelength conversion region WR and a reflection region RR, and the first laser light beam 50B1 and the second laser light beam 50B2 coming from the first region R1 of the first light-splitting element DN eccentrically pass through the light converging module CL1 to be incident to the wavelength conversion module 120. For example, first laser light beam 50B1 and the second laser light beam 50B2 pass through a left half side of the light converging lens CL1 shown in FIG. 1A and are incident to the wavelength conversion module 120.

To be specific, in the embodiment, the second laser light beam 50B2 with the shorter wavelength excites a wavelength conversion material disposed on the at least one wavelength conversion region WR of the wavelength conversion module 120 more efficiently, so that the second laser beam 50B2 is more easily converted into at least one converted light beam 60. For example, if an excitation efficiency of the second laser light beam 50B2 with the shorter wavelength to the wavelength conversion material disposed on the at least one wavelength conversion region WR is 100%, an excitation efficiency of the first laser light beam 50B1 with the longer wavelength to the wavelength conversion material disposed on the at least one wavelength conversion region WR is then 80%. In this way, the second laser light beam 50B2 and the first laser light beam 50B1 may be all or partially converted into the at least one converted light beam 60 by the at least one wavelength conversion region WR of the wavelength conversion module 120. The wavelength conversion module 120, for example, has a reflection layer corresponding to the at least one wavelength conversion region WR, or the wavelength conversion module 120 has a metal substrate used for reflecting the converted light beam 60. On the other hand, the reflection region RR of the wavelength conversion module 120 is used for reflecting the first laser light beam 50B1 and the second laser light beam 50B2, so as to transmit the first laser light beam 50B1 and the second laser light beam 50B2 to the subsequent optical elements.

Moreover, the wavelength conversion module 120 further includes a first actuator (not shown) electrically connected to the control module 130. The control module 130 may control the first actuator to drive the wavelength conversion module 120 to rotate, such that the at least one wavelength conversion region WR and the reflection region RR are cut into the transmission path of the first laser light beam 50B1 and the second laser light beam 50B2 at different time period, so as to selectively convert the first laser light beam 50B1 and the second laser light beam 50B2 into the at least one converted light beam 60 or reflect the first laser light beam 50B1 and the second laser light beam 50B2. Namely, in the embodiment, in the embodiment, the control module 130 may control a time interval when the reflection region RR of the wavelength conversion module 120 is cut into the transmission path of the first laser light beam 50B1 and the second laser light beam 50B2 through the first actuator, and set the time interval as a first time interval T1, and may also control a time interval when the at least one wavelength conversion region WR of the wavelength conversion module 120 is cut into the transmission path of the first laser light beam 50B1 and the second laser light beam 50B2 through the first actuator, and set the time interval as a second time interval T2.

Thereafter, as shown in FIG. 1A, in the embodiment, the first laser light beam 50B1, the second laser light beam 50B2 and the at least one converted beam 60 coming from the wavelength conversion module 120 may be further guided to subsequent optical elements. In the embodiment, in the first time interval T1, after the first laser light beam 50B1 and the second laser light beam 50B2 are reflected by the reflection region RR of the wavelength conversion module 120, the first laser light beam 50B1 and the second laser light beam 50B2 are transmitted to the second region R2 of the first light-splitting element DN through the light converging lens CL1, and the first laser light beam 50B1 and the second laser light beam 50B2 reflected by the reflection region RR are eccentrically incident to the light converging lens CL1 and transmitted to the second region R2. For example, the first laser light beam 50B1 and the second laser light beam 50B2 pass through a right half side of the light converging lens CL1 shown in FIG. 1A and are incident to the second region R2 of the first light-splitting element DN. For example, in the embodiment, the second region R2 of the first light-splitting element DN may be a partial reflection and penetration element, so that a part of the first laser light beam 50B1 and the second laser light beam 50B2 is reflected by the second region R2, and another part of the first laser light beam 50B1 and the second laser light beam 50B2 passes through the second region R2 and is transmitted to the subsequent light transmitting element LT. In other embodiments, the second region R2 of the first light-splitting element DN, for example, allows the blue light beam to pass through, and provides a reflection function to light beams of other colors (for example, red, green, yellow, etc.), i.e. the first laser light beam 50B1 and the second laser light beam 50B2 passes through the second region R2 and are transmitted to the subsequent light transmitting element LT.

To be specific, as shown in FIG. 1A, in the embodiment, the light transmitting element LT is located on the transmission path of the first laser light beam 50B1 and the second laser light beam 50B2 coming from the reflection region RR of the wavelength conversion module 120, where the second region R2 of the first light-splitting element DN is located between the wavelength conversion module 120 and the light transmitting element LT. In this way, when the second region R2 of the first light-splitting element DN is the partial reflection and penetration element, a part of the first laser light beam 50B1 and the second laser light beam 50B2 is reflected by the second region R2, and another part of the first laser light beam 50B1 and the second laser light beam 50B2 passes through the second region R2 and is transmitted to the subsequent light transmitting element LT, and the another part of the first laser light beam 50B1 and the second laser light beam 50B2 passing through the second region R2 is reflected by the light transmitting element LT. The part of the first laser light beam 50B1 and the second laser light beam 50B2 reflected by the second region R2 and the another part of the first laser light beam 50B1 and the second laser light beam 50B2 reflected by the light transmitting element LT have the same transmission direction, but are respectively incident to different positions of one side of another light converging lens CL2, and are converged to the filter module 140 by the light converging lens CL2. In another embodiment, when the second region R2 of the first light-splitting element DN allows the blue light beam to penetrate through, but provides a reflection function to light beams of other colors (for example, red, green, yellow, etc.), the first laser light beam 50B1 and the second laser light beam 50B2 penetrate through the second region R2 of the first light-splitting element DN, and are reflected by the light transmitting element LT, and transmitted to the subsequent another light converging lens CL2 and the filter module 140. The at least one converted light beam 60 is reflected by the second region R2 of the first light-splitting element DN, and transmitted to the subsequent another light converging lens CL2 and the filter module 140.

As shown in FIG. 1A and FIG. 1C, the wavelength conversion module 120 of the embodiment includes two wavelength conversion regions WR, which respectively include a wavelength conversion material capable of converting the blue light beam into a red light beam and a wavelength conversion material capable of converting the blue light beam into a green light beam. In the second time interval T2, the two wavelength conversion regions WR of the wavelength conversion module 120 are cut into the transmission path of the first excitation light beam 50B1 and the second excitation light beam 50B2 in turn, and all of or at least part of the first excitation light beam 50B1 and the second excitation light beam 50B2 are respectively converted into the red light beam and the green light beam. The converted light beam 60 is the red light beam or the green light beam are, and the converted light beam 60 is reflected to the first light-splitting element DN, and the converted light beam 60 incident to the first region R1 of the first light-splitting element DN is reflected to the filter module 140. When the second region R2 of the first light-splitting element DN is the partial reflection and penetration element, a part of the converted light beam 60 is reflected by the second region R2, and another part of the converted light beam 60 passes through the second region R2 and is transmitted to the light transmitting element LT, and the another part of the converted light beam 60 passing through the second region R2 is reflected by the light transmitting element LT. In another embodiment, when the second region R2 of the first light-splitting element DN allows the blue light beam to penetrate through, but provides a reflection function to light beams of other colors (for example, red, green, yellow, etc.), the converted light beam 60 incident to the second region R2 of the first light-splitting element DN is reflected to the filter module 140.

As shown in FIG. 1A and FIG. 1D, in the embodiment, the filter module 140 is located on the transmission path of the first laser light beam 50B1, the second laser light beam 50B2 and the converted light beam 60, and the filter module 140 has filter regions FR1, FR2 and a transparent region TR. The filter module 140 further includes a second actuator (not shown) configured to drive the filter module 140 to rotate, such that the filter regions FR1, FR2 and the transparent region TR are correspondingly cut into the transmission path of the converted light beam 60 or the first laser light beam 50B1 and the second laser light beam 50B2 at different time.

For example, a red filter and a green filter are respectively disposed on the filter regions FR1, FR2 of the filter module 140. In the embodiment, the filter regions FR1 and FR2 are correspondingly cut into the transmission path of the converted light beam 60 at different time intervals T2R and T2G of the second time interval T2, so as to respectively form a first color light and a second color light, and in the embodiment, the first color light and the second color light are respectively purer red color light and green color light. On the other hand, the transparent region TR is also correspondingly cut into the transmission path of the first laser light beam 50B1 and the second laser light beam 50B2 transmitted to the filter module 140 in the first time interval T1, so as to form the blue color light. In this way, the first laser light beam 50B1, the second laser light beam 50B2 and the converted light beam 60 are sequentially pass through the filter module 140 to form the illumination light beam 70 with different colors.

Namely, in the embodiment, the illumination system 100 provides a blue color light portion of the illumination light beam 70 in the first time interval T1, and respectively provides a red color light portion and a green color light portion of the illumination light beam 70 in the second time interval T2. To be specific, since human eyes have better sense for the first laser light beam 50B1 with a longer wavelength, and the second laser light beam 50B2 with the shorter wavelength has higher excitation efficiency to the wavelength conversion material, in the embodiment, the control module 130 may enhance a proportion of the first laser light beam 50B1 relative to the second laser light beam 50B2 in the first time interval T1, and enhance a proportion of the second laser light beam 50B2 relative to the first laser light beam 50B1 in the second time interval T2, so as to achieve a good color performance of the illumination beam 70, which is further described below with reference of FIG. 1E and FIG. 1F.

Figure 1E:
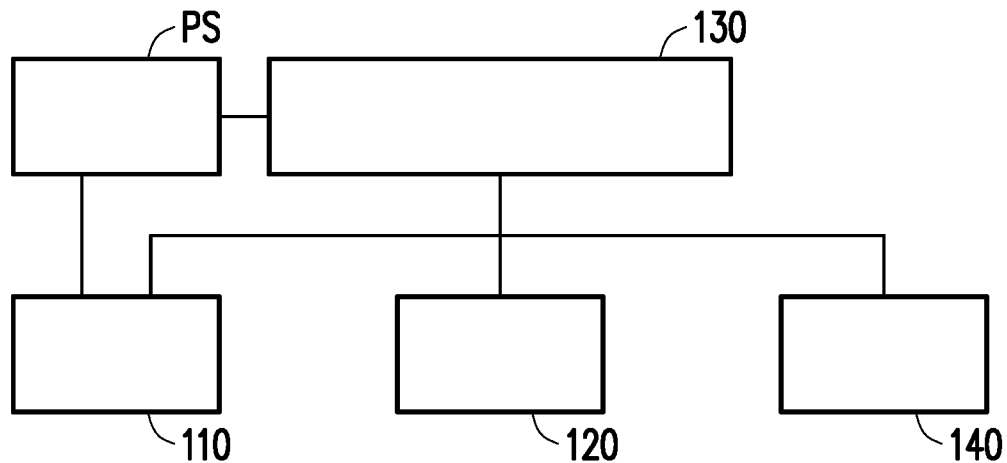
FIG. 1E is a block diagram of a control module and other components according to an embodiment of the invention.
Figure 1F:
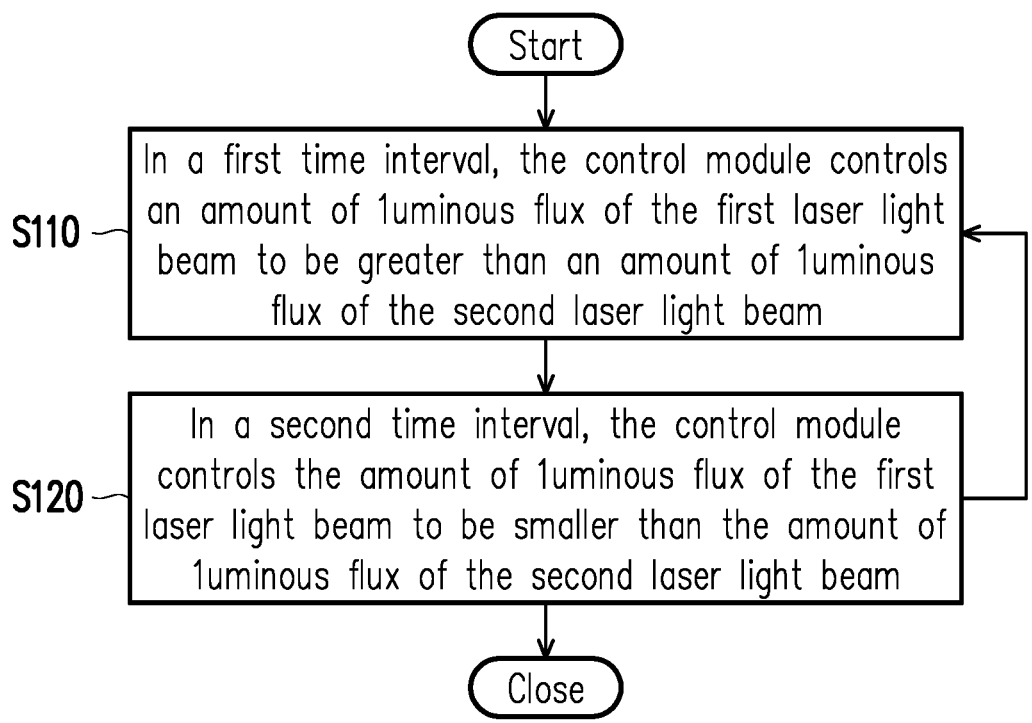
FIG. 1F is a flowchart illustrating an illumination control method according to an embodiment of the invention.

FIG. 1E is a block diagram of the control module 130 and other components according to an embodiment of the invention. FIG. 1F is a flowchart illustrating an illumination control method according to an embodiment of the invention. As shown in FIG. 1E, the control module 130 is electrically connected to the laser light source module 110 and the wavelength conversion module 120, respectively. In this way, the control module 130 may control operations of the laser light source module 110 and the wavelength conversion module 120. For example, the illumination system 100 and the projection apparatus 200 shown in FIG. 1 may execute the illumination control method of FIG. 1F, so as to control an amount of luminous flux of the first laser light beam 50B1 emitted from the at least one first laser element and an amount of luminous flux of the second laser light beam 50B2 emitted from the second laser element 112 in different time intervals, and accordingly achieve good color performance of the illumination beam 70.

For example, as shown in FIG. 1B and FIG. 1F, when the illumination system 100 and the projection apparatus 200 are turned on, the control module 130 may execute a step S110, in the first time interval T1, the control module 130 controls the amount of luminous flux of the first laser light beam 50B1 to be greater than the amount of luminous flux of the second laser light beam 50B2. Then, in a step S120, in the second time interval T2, the control module 130 controls the amount of luminous flux of the first laser light beam 50B1 to be smaller than the amount of luminous flux of the second laser light beam 50B2. Thereafter, the control module 130 returns to execute the steps S110 and S120 until the illumination system 100 and the projection apparatus 200 are turned off.

For example, the method that the control module 130 controls the amount of luminous flux of the first laser light beam 50B1 and the amount of luminous flux of the second laser light beam 50B2 may be achieved through a following method, but the invention is not limited thereto.

For example, in an embodiment, as shown in FIG. 1E, the illumination system 100 further includes a power supply module PS. The power supply module PS is electrically connected to the control module 130 and the laser light source module 110, and is configured to respectively provide currents to the first laser element 111 and the second laser element 112 of the laser light source module 110. In this way, in the first time interval T1, the control module 130 may control the current provided to the at least one first laser element 111 by the power supply module PS to be greater than the current provided to the at least one second laser element 112, and in the second time interval T2, the control module 130 may control the current provided to the at least one first laser element 111 by the power supply module PS to be smaller than the current provided to the at least one second laser element 112. In this way, the control of the amount of luminous flux of the first laser light beam 50B1 and the amount of luminous flux of the second laser light beam 50B2 is achieved.

For example, in another embodiment, in the first time interval T1, the control module 130 may control a duty ratio of the at least one first laser element 111 to be greater than a duty ratio of the at least one second laser element 112, and in the second time interval T2, the control module 130 may control the duty ratio of the at least one first laser element 111 to be smaller than the duty ratio of the at least one second laser element 112. In this way, the control of the amount of luminous flux of the first laser light beam 50B1 and the amount of luminous flux of the second laser light beam 50B2 may also be achieved.

For example, in another embodiment, the illumination system 100 may include a plurality of first laser elements 111 and a plurality of second laser elements 112, and in the first time interval T1, the control module 130 may control the number of the first laser elements 111 in a turn-on state to be greater than the number of the second laser elements 112 in the turn-on state, and in the second time interval T2, the control module 130 may control the number of the first laser elements 111 in the turn-on state to be smaller than the number of the second laser elements 112 in the turn-on state. In this way, the control of the amount of luminous flux of the first laser light beam 50B1 and the amount of luminous flux of the second laser light beam 50B2 may also be achieved.

Moreover, the method that the control module 130 controls the amount of luminous flux of the first laser light beam 50B1 and the amount of luminous flux of the second laser light beam 50B2 may also be achieved by simultaneously executing the aforementioned methods or any two of the aforementioned methods, which is not limited by the invention.

In this way, the illumination system 100 of the projection apparatus 200 may control a proportion of the amount of luminous flux of the first laser light beam 50B1 and the amount of luminous flux of the second laser light beam 50B2 in different time intervals to achieve the good color performance of the illumination light beam 70. Moreover, in the embodiment, since the at least one first laser element 111 and the at least one second laser element 112 may be simultaneously turned on to operate, they are all adapted to provide the blue light or excite the wavelength conversion material, thereby reducing a total number of the laser elements required for the illumination system 100, and reducing the cost. Moreover, since the total number of the laser elements is reduced, it avails heat dissipating of the projection apparatus 200. Moreover, since the at least one first laser element 111 and the at least one second laser element 112 are both disposed in the laser light source module 110, and has the same optical path, a design of the optical path is relatively simple, and an overall device size is also reduced. In addition, since the second laser light beam 50B2 with the short wavelength is purple-biased in human vision, by mixing it with the first laser light beam 50B1 with the long wavelength, the problem of blue light purple-biased is mitigated, so as to achieve the good color performance of the illumination beam.

On the other hand, as shown in FIG. 1A, in the embodiment, the light homogenizing element 150 is located on the transmission path of the illumination light beam 70. In the embodiment, the light homogenizing element 150 includes an integration rod, but the invention is not limited thereto. To be specific, as shown in FIG. 1A, when the illumination light beam 70 passing through the filter module 140 is transmitted to the light homogenizing element 150, the light homogenizing element 150 may uniform the illumination light beam 70 and transmits the same to the light valve 210.

Then, as shown in FIG. 1A, the light valve 210 is located on the transmission path of the illumination light beam 70, and is configured to modulate the illumination light beam 70 into an image beam 80. The projection lens 220 is located on a transmission path of the image beam 80 and is configured to receive and project the image beam 80 to form a projection beam 90, and the projection beam 90 may be projected onto a screen (not shown) to form an image frame. After the illumination light beam 70 irradiates the light valve 210, the light valve 210 sequentially modulates the illumination light beam 70 into the image beam 80 of different colors for transmitting to the projection lens 220. Therefore, the projection lens 220 receives the image beam 80 modulated by the light valve 210, and the image frame formed by the projection beam 90 may be a color image.

Figure 2A:
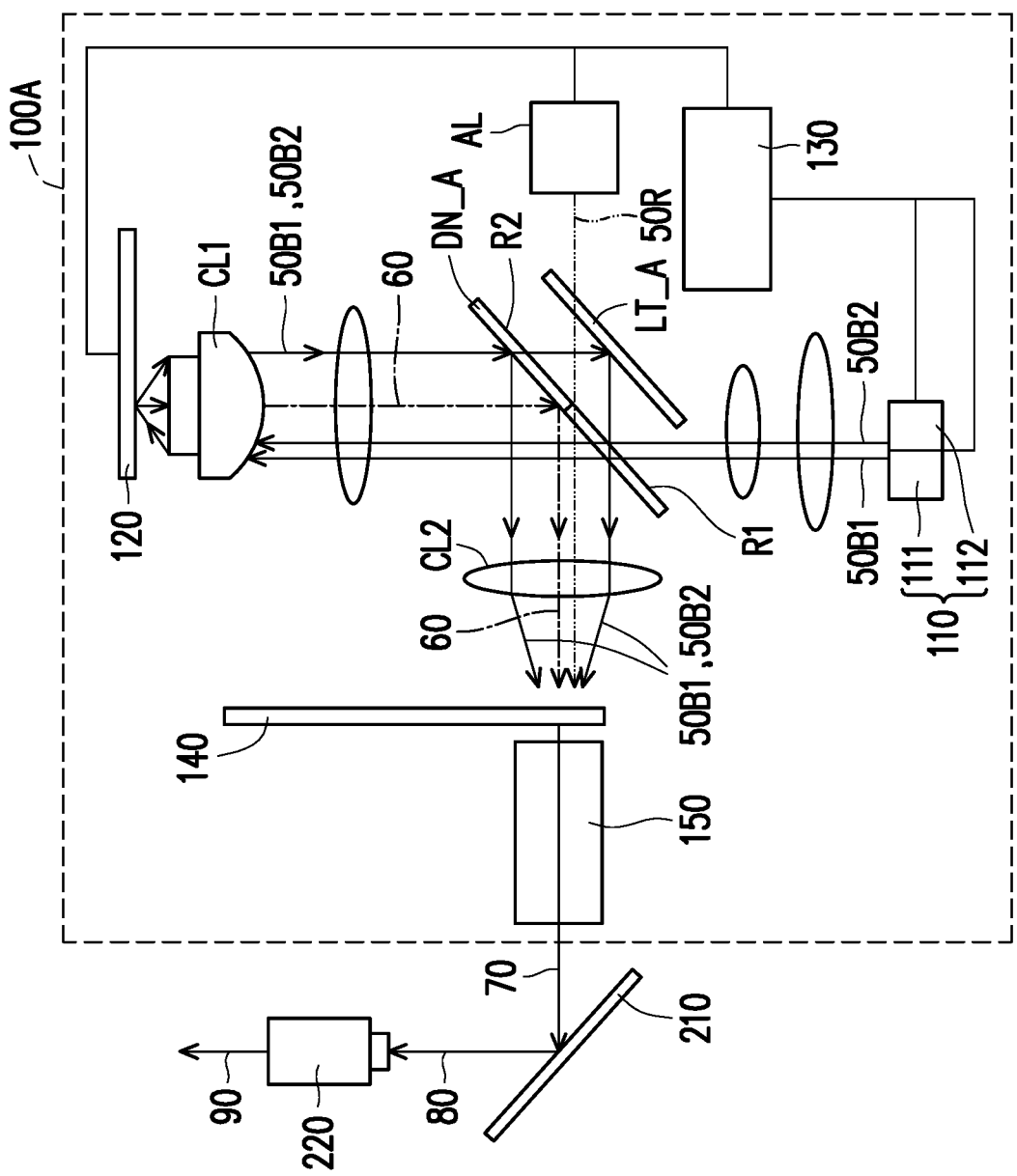
FIG. 2A is a schematic diagram of an optical framework of a projection apparatus according to an embodiment of the invention.
Figure 2B:
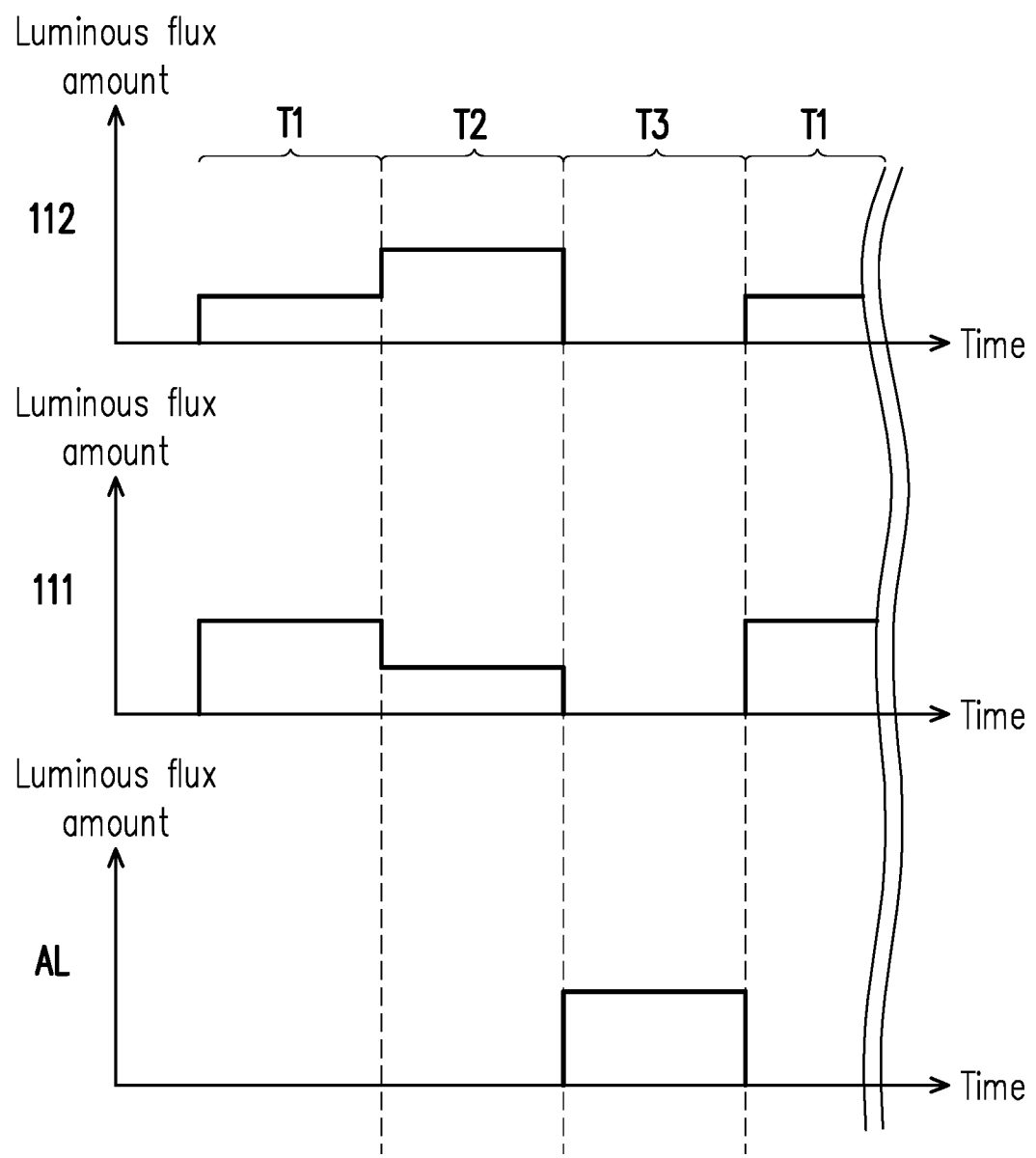
FIG. 2B is a timing schematic diagram of luminous flux amounts provided by a first laser light beam, a second laser light beam and an auxiliary light beam in different time intervals.
Figure 2C:
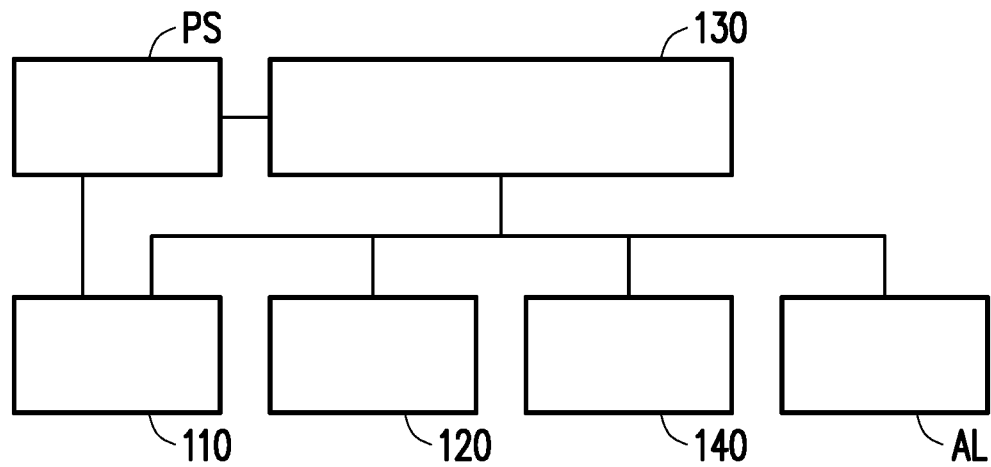
FIG. 2C is a block diagram of a control module and other components according to an embodiment of the invention.
Figure 2D:
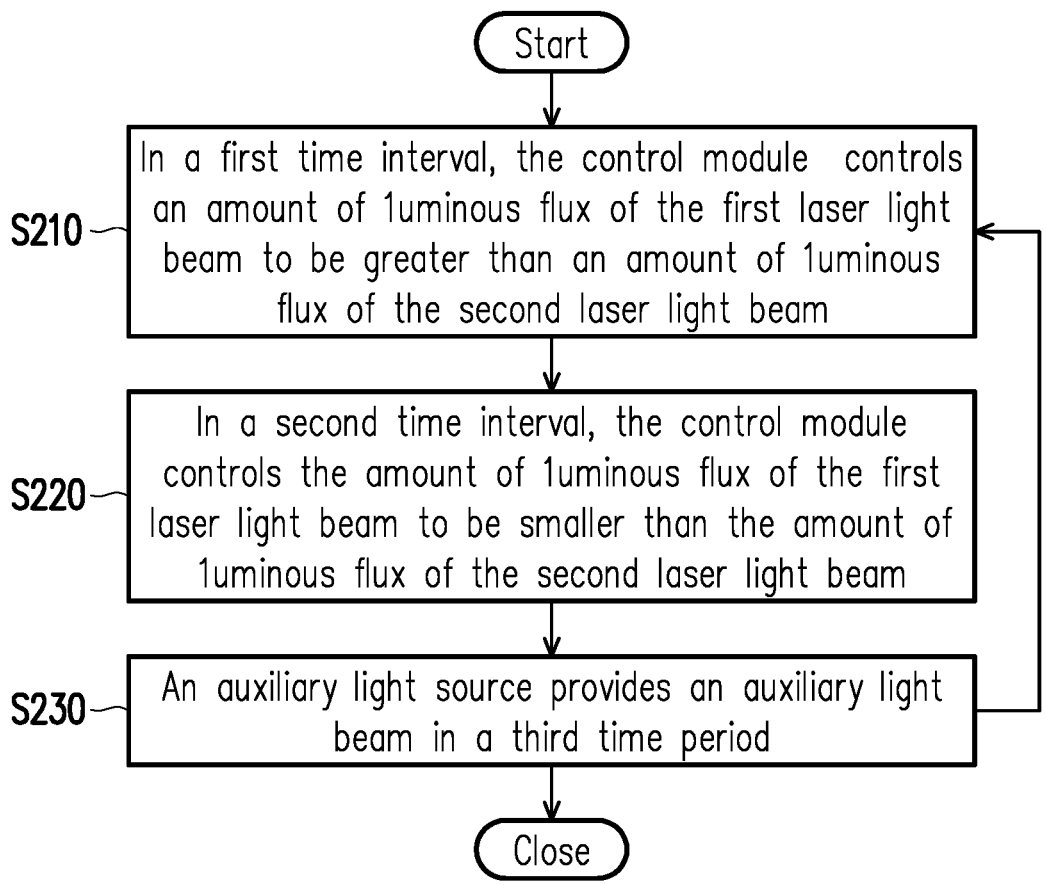
FIG. 2D is a flowchart illustrating an illumination control method according to an embodiment of the invention.

FIG. 2A is a schematic diagram of an optical framework of a projection apparatus according to an embodiment of the invention. FIG. 2B is a timing schematic diagram of amounts of luminous flux provided by the first laser light beam, the second laser light beam and an auxiliary light beam in different time intervals. FIG. 2C is a block diagram of a control module and other components according to an embodiment of the invention. FIG. 2D is a flowchart illustrating an illumination control method according to an embodiment of the invention. Referring to FIG. 2A to FIG. 2D, the illumination system 100A and the projection apparatus 200A of FIG. 2A are similar to the illumination system 100 and the projection apparatus 200 of FIG. 1, and differences there between are as follows. To be specific, as shown in FIG. 2A, in the embodiment, the illumination system 100A further includes an auxiliary light source AL. The auxiliary light source AL is configured to provide an auxiliary light beam 50R, a peak wavelength of the auxiliary light beam 50R is different to the peak wavelength of the first laser light beam 50B1 and the peak wavelength of the second laser light beam 50B2. For example, a difference between the peak wavelength of the auxiliary light beam 50R and the peak wavelength of the second laser light beam 50B2 is greater than 100 nm. Moreover, in the embodiment, the auxiliary light source AL is, for example, a red laser light source, and may be a plurality of red laser diodes arranged in an array (not shown), and the auxiliary light beam 50R is a red light beam. The auxiliary light beam 50R is transmitted to a first light-splitting element DN_A along a direction perpendicular to the transmission direction of the first laser light beam 50B1 and the second laser light beam 50B2 simultaneously emitted from the laser light source module 110.

Further, as shown in FIG. 2A, in the embodiment, the first light-splitting element DN_A and the light transmitting element LT_A of the illumination system 100A are all located on the transmission path of the first laser light beam 50B1, the second laser light beam 50B2 and the auxiliary light beam 50R. Moreover, in the embodiment, the first region R1 of the first light-splitting element DN_A, for example, allows the blue light beam and the red light beam to pass through, but provides the reflection function to the light beams of the other colors (for example, green, yellow, etc.), and the second region R2 of the first light-splitting element DN_A, for example, provides a partial reflection and penetration function to the blue light beam, but allows the red light beam to pass through, or allows the blue light beam and the red light beam to pass through, but provides the reflection function to the light beams of the other colors (for example, green, yellow, etc.). The light transmitting element LT_A allows the red light beam to pass through, but provides the reflection function to the light beams of the other colors (for example, blue, green, yellow, etc.). In this way, the auxiliary light beam 50R of the auxiliary light source AL may be transmitted to the filter module 140 by passing through the first light-splitting element DN_A and the light transmitting element LT_A. As shown in FIG. 2A, the wavelength conversion module 120 of the embodiment includes a wavelength conversion region WR, which has a wavelength conversion material capable of converting a blue light beam into a red light beam (the converted light beam 60). The first laser light beam 50B1, the second laser light beam 50B2 and the converted light beam 60 may also be transmitting to the filter module 140 along an optical path similar to that of the illumination system 100 of FIG. 1A.

Further, as shown in FIG. 2B to FIG. 2D, the control module 130 is electrically connected to the auxiliary light source AL, and the illumination system 100A shown in FIG. 2A may execute the illumination control method of FIG. 2D to control the amount of luminous flux of the first laser light beam 50B1 and the amount of luminous flux of the second laser light beam 50B2 in different time intervals, so as to achieve the good color performance of the illumination light beam 70.

For example, as shown in FIG. 2B and FIG. 2D, when the illumination system 100A and the projection apparatus 200A are turned on, the control module 130 may execute a step S210, in the first time interval T1, the control module 130 controls an amount of luminous flux of the first laser light beam 50B1 to be greater than an amount of luminous flux of the second laser light beam 50B2, and does not provide the auxiliary light beam 50R. Then, in a step S220, in the second time interval T2, the control module 130 controls the amount of luminous flux of the first laser light beam 50B1 to be smaller than the amount of luminous flux of the second laser light beam 50B2, and does not provide the auxiliary light beam 50R. Thereafter, in a step S230, the auxiliary light source AL provides the auxiliary light beam 50R in a third time period T3, where the third time period T3 is not overlapped with the first time period T1 and the second time period T2, and in the third time period T3, the control module 130 turns off the laser light source module 110, i.e. in the third time period T3, the laser light source module 110 does not provide the first laser light beam 50B1 and the second laser light beam 50B2. Thereafter, the control module 130 returns to execute the steps S210, S220 and S230 until the illumination system 100A and the projection apparatus 200A are turned off.

Moreover, in the embodiment, a method of executing the steps S210 and S220 is the same to the method of executing the steps S110 and S120, and related detail thereof may refer to related description of the steps S110, S120, which are not repeated. Moreover, it should be noted that in the embodiment, although the control module 130 operates in a manner of sequentially executing the steps S210, S220 and S230, the invention is not limited thereto, and in other embodiments, the control module 130 may also execute the steps S210, S220 and S230 in a different sequence as long as the third time interval T3 is not overlapped with the first time interval T1 and the second time interval T2.

In this way, as shown in FIG. 1C, FIG. 1D, FIG. 2A to FIG. 2D, in the embodiment, the reflection region RR of the wavelength conversion module 120 and the transparent region TR of the filter module 140 are correspondingly cut into the transmission path of the first laser light beam 50B1 and the second laser light beam 50B2 in the first time interval T1 to form the blue color light. On the other hand, the wavelength conversion region WR of the wavelength conversion module 120 and the filter region FR2 of the filter module 140 are correspondingly cut into the transmission path of the converted light beam 60 in the second time interval T2 to form a second color light, and in the embodiment, the second color light is a green color light. Moreover, the filter region FR1 of the filter module 140 is also correspondingly cut into the transmission path of the auxiliary light beam 50R transmitted to the filter module 140 in the third time interval T3 to form a purer red color light. In this way, the first laser light beam 50B1, the second laser light beam 50B2, the converted light beam 60 and the auxiliary light beam 50R may sequentially form the illumination light beam 70 of a plurality of different colors.

Therefore, the illumination system 100A may increase a red light proportion in the illumination light beam 70 through the configuration of the auxiliary light source AL, so as to improve a red color performance of a projected image and achieve a good color performance of the output light beam. Moreover, in the embodiment, since the illumination system 100A of FIG. 2A and the illumination system 100 of FIG. 1 adopt the same structure of the laser light source module 110 and the similar illumination control method, the illumination system 100A may achieve similar effects and advantages as that of the aforementioned illumination system 100, which are not repeated. Moreover, the projection apparatus 200A adopting the illumination system 100A may also provide the image frame with good color performance, so as to achieve the similar effects and advantages as that of the aforementioned projection apparatus 200, which are not repeated.

It should be noted that in the embodiment, although the situation that the auxiliary light source AL is the red laser light source, and the auxiliary light beam 50R is the red light beam is taken as an example for description, the invention is not limited thereto. In another embodiment, the auxiliary light source AL may also be a green laser light source, and the auxiliary light beam 50R is a green light beam, and in this case, the color light formed by the converted light beam after passing through the filter region is the first color light, i.e. the red color light. Therefore, the illumination system 100A and the projection apparatus 200A may also achieve the aforementioned effects and advantages, which are not repeated.

Figure 3A:
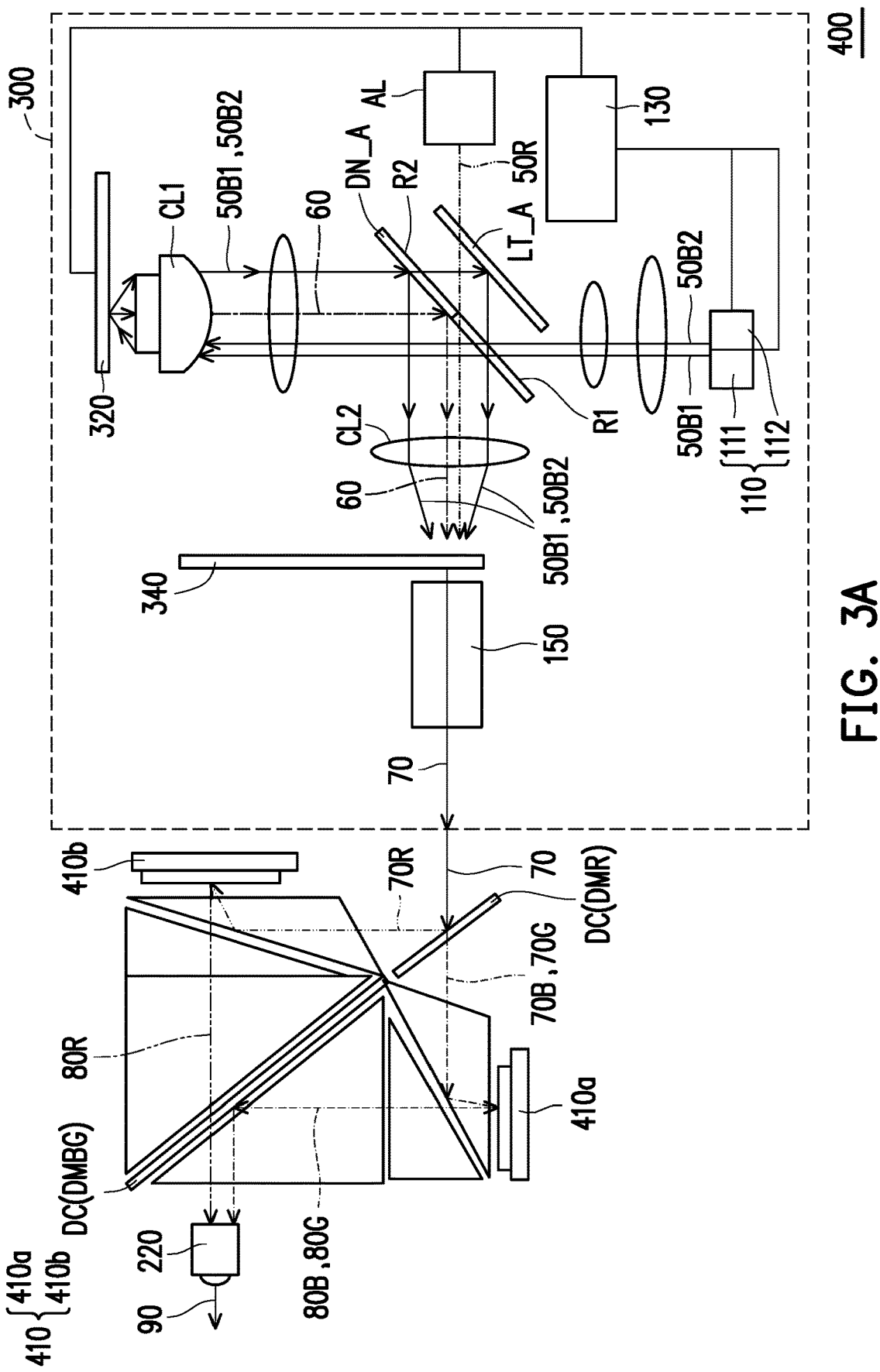
FIG. 3A is a schematic diagram of an optical framework of a projection apparatus according to an embodiment of the invention.
Figure 3B:
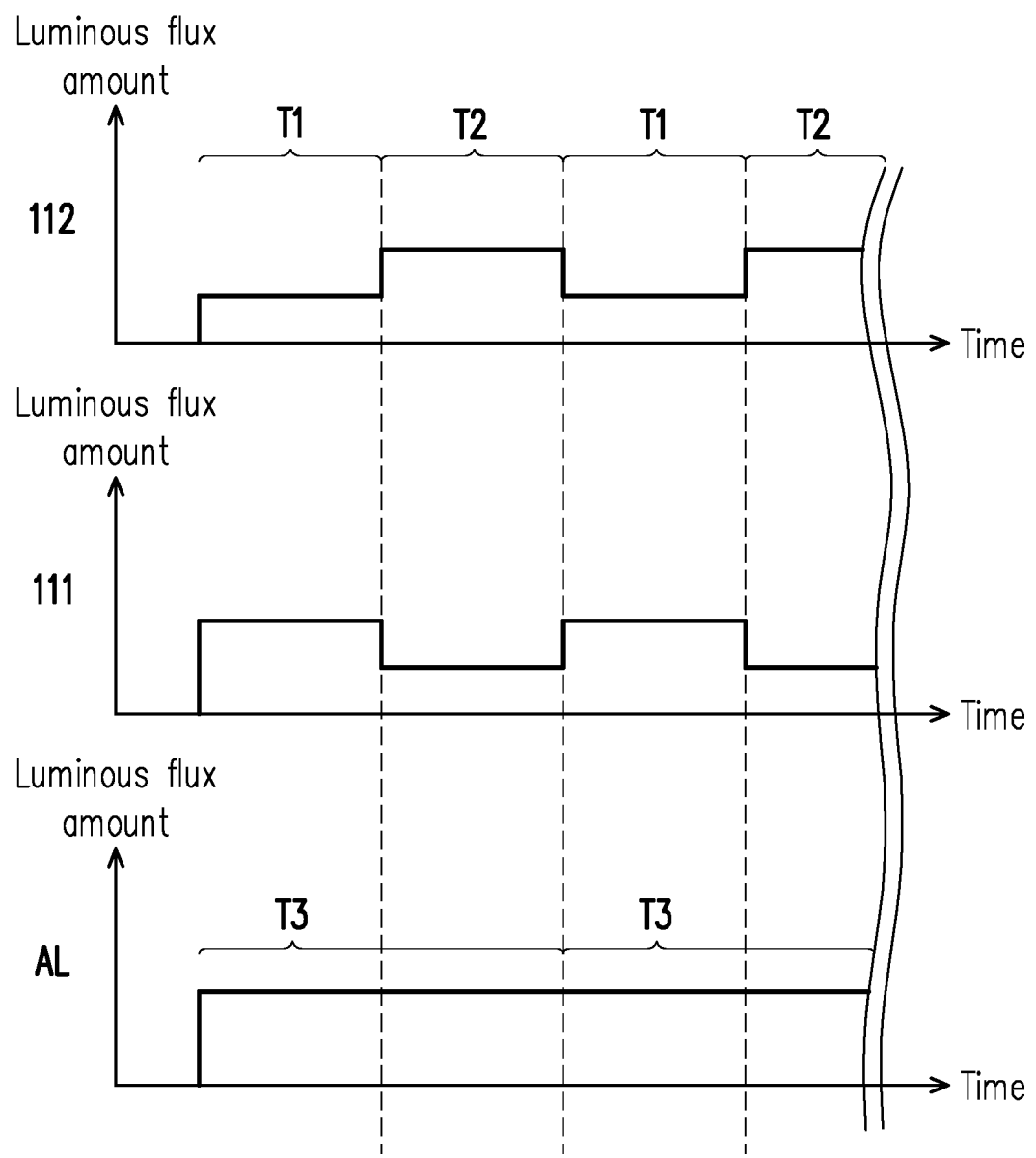
FIG. 3B is a timing schematic diagram of luminous flux amounts provided by a first laser light beam, a second laser light beam and anauxiliary light beam in different time intervals.
Figure 3C:
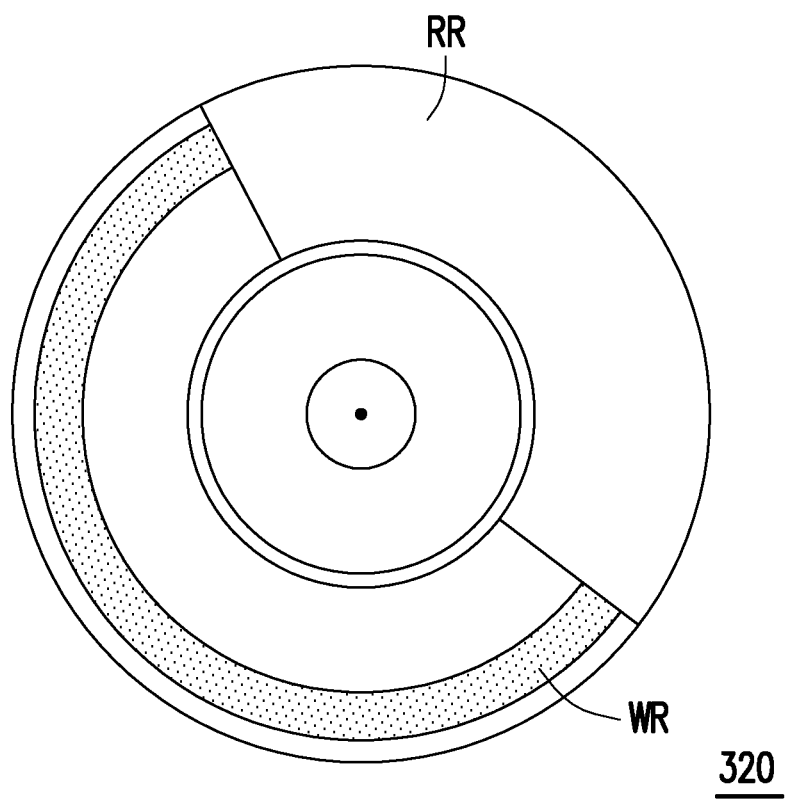
FIG. 3C is top view of a wavelength conversion module of FIG. 3A.
Figure 3D:
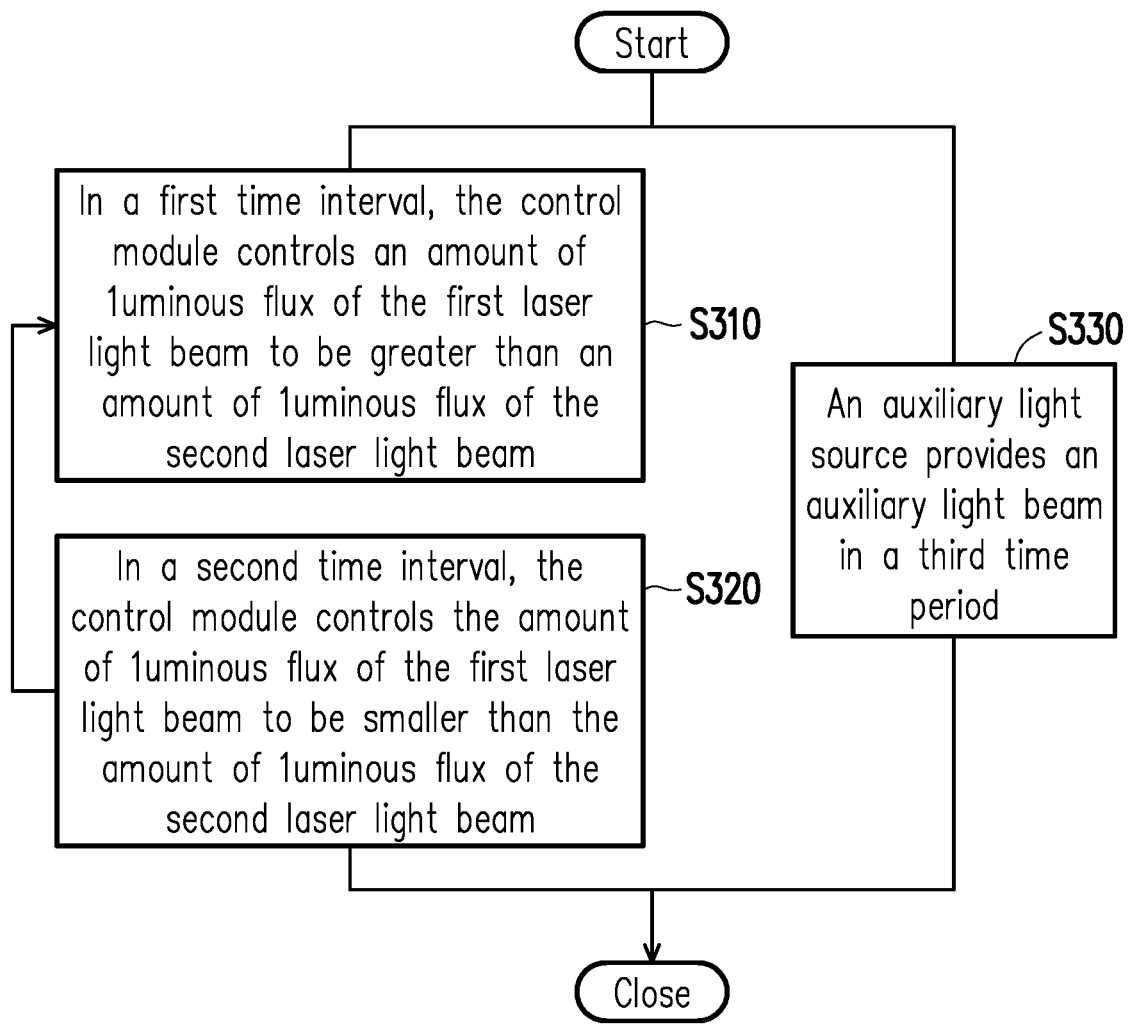
FIG. 3D is a flowchart illustrating an illumination control method according to an embodiment of the invention.

FIG. 3A is a schematic diagram of an optical framework of a projection apparatus according to an embodiment of the invention. FIG. 3B is a timing schematic diagram of amounts of luminous flux provided by the first laser light beam, the second laser light beam and the auxiliary light beam in different time intervals. FIG. 3C is top view of a wavelength conversion module of FIG. 3A. FIG. 3D is a flowchart illustrating an illumination control method according to an embodiment of the invention. Referring to FIG. 3A to FIG. 3D, the projection apparatus 400 of FIG. 3A is similar to the projection apparatus 200 of FIG. 1A, and differences there between are as follows. In the embodiment, the number of the light valves 410 of the projection apparatus 400 is two, which are respectively light valves 410a and 410b. Moreover, the illumination system 300 of the projection apparatus 400 of FIG. 3A is similar to the illumination system 100A of FIG. 2A, and differences there between are that the wavelength conversion module 320 of the illumination system 300 is similar to the wavelength conversion module 120 of FIG. 1C, but a proportion of occupation areas of the reflection region RR and the wavelength conversion region WR of the wavelength conversion module 320 is different to that of the wavelength conversion module 120, and the illumination system 300 of FIG. 3A is not configured with the filter module, but is configured with a diffusion element 340, where the diffusion element 340 may be a diffuser or a rotatable diffuser wheel.

To be specific, as shown in FIG. 3A and FIG. 3B, in the embodiment, since the projection apparatus 400 has two light valves 410a and 410b, the laser light source module 110 and the auxiliary light source AL may be independently controlled and simultaneously turned on to still respectively produce the different color lights in the illumination light beam 70. For example, in the embodiment, the illumination system 300 of FIG. 3A may execute the illumination control method of FIG. 3D to control the amount of the luminous flux of the first laser light beam 50B1 and the amount of the luminous flux of the second laser light beam 50B2 in different time intervals, so as to achieve the good color performance of the illumination light beam 70.

For example, as shown in FIG. 3A, FIG. 3B and FIG. 3D, when the illumination system 300 and the projection apparatus 400 are turned on, the control module 130 may execute a step S310, in the first time interval T1, the control module 130 controls an amount of the luminous flux of the first laser light beam 50B1 to be greater than an amount of the luminous flux of the second laser light beam 50B2. Then, in a step S320, in the second time interval T2, the control module 130 controls the amount of the luminous flux of the first laser light beam 50B1 to be smaller than the amount of the luminous flux of the second laser light beam 50B2. Thereafter, the control module 130 returns to execute the steps S310, and S320 until the illumination system 300 and the projection apparatus 400 are turned off. Moreover, while the steps S310 and S320 are executed, the step S330 may also be executed, by which the auxiliary light source AL provides the auxiliary light beam 50R in the third time interval T3, where the third time interval T3 may be overlapped with the first time interval T1 and the second time interval T2, and in the third time interval T3, the control module 130 still activates the laser light source module 110. Moreover, in the embodiment, a method of executing the steps S310 and S320 is the same to the method of executing the steps S110 and S120, and related detail thereof may refer to related description of the steps S110, S120, which are not repeated.

In this way, as shown in FIG. 3A, FIG. 3B, FIG. 3C and FIG. 3D, in the embodiment, the reflection region RR of the wavelength conversion module 320 is correspondingly cut into the transmission path of the first laser light beam 50B1 and the second laser light beam 50B2 in the first time interval T1 to form the blue color light. On the other hand, the wavelength conversion region WR of the wavelength conversion module 320 is correspondingly cut into the transmission path of the converted light beam 60 in the second time interval T2 to form a second color light, and in the embodiment, the second color light is a green color light. Moreover, the auxiliary light beam 50R may be transmitted to the diffusion element 340 in the third time interval T3 to form the red color light. When the first time interval T1 is overlapped with the third time interval T3, the blue color light (the first laser light beam 50B1 and the second laser light beam 50B2) and the red color light (the auxiliary light beam 50R) simultaneously pass through the diffusion element 340 to enter the light homogenizing element 150. When the second time interval T2 is overlapped with the third time interval T3, the red color light (the auxiliary light beam 50R) and the green color light (the converted light beam 60) simultaneously pass through the diffusion element 340 to enter the light homogenizing element 150. In this way, the first laser light beam 50B1, the second laser light beam 50B2, the auxiliary light beam 50R and the converted light beam 60 may sequentially form the illumination light beam 70 with a plurality of different colors.

Then, as shown in FIG. 3A, in the embodiment, a light-splitting/combining unit DC is disposed on the transmission path of the illumination light beam 70, and is configured to split the illumination light beam 70 into a plurality of sub-illumination light beams 70R, 70G and 70B and combine image beams 80R, 80G and 80B to form the projection beam 90. For example, as shown in FIG. 3A, the light-splitting/combining unit DC may include a dichroic mirror DMR adapted to allow the blue light and the green light to pass through and reflect the red light and a dichroic mirror DMBG adapted to reflect the blue light and the green light and allow the red light to pass through.

In this way, in case that the laser light source module 110 is turned on, when the illumination light beam 70 coming from the light homogenizing element 150 reaches the dichroic mirror DMR, the green color light and the blue color light in the illumination light beam 70 may penetrate through the dichroic mirror DMR of the light-splitting/combining unit DC to respectively form a plurality of sub-illumination light beams 70G and 70B, and the sub-illumination light beams 70G and 70B are transmitted to the subsequent corresponding light valve 410a. Then, the light valve 410a sequentially modulates the sub-illumination light beams 70G and 70B into a plurality of image beams 80G and 80B.

On the other hand, when the auxiliary light source AL is turned on, the auxiliary light beam 50R is reflected by the dichroic mirror DMR of the light-splitting/combining unit DC to form the sub-illumination light beam 70R, and the sub-illumination light beam 70R is transmitted to the subsequent light valve 410b. Then, the light valve 410b modulates the sub-illumination light beam 70R into the corresponding image beam 80R, and the image beams 80R, 80G and 80B are then combined by the dichroic mirror DMBG of the light-splitting/combining unit DC and transmitted to the projection lens 220. Moreover, the projection lens 220 is located on a transmission path of the image beams 80R, 80G and 80B, and is configured to convert the image beams 80R, 80G and 80B into a projection beam 90, and projects the projection beam 90 to a screen (not shown). In this way, the projected image frame may be a color image.

Therefore, the illumination system 300 may increase a red light proportion in the illumination light beam 70 through the configuration of the auxiliary light source AL, so as to improve a red color performance of a projected image and achieve a good color performance of the output light beam. Moreover, in the embodiment, since the projection apparatus 400 adopts the illumination system 300, the projection apparatus 400 may also achieve the similar effects and advantages as that of the aforementioned projection apparatus 200, which are not repeated.

In summary, the embodiments of the invention have at least one of following advantages or effects. In the embodiments of the invention, the illumination system of the projection apparatus controls a proportion of the amount of the luminous flux of the first laser light beam and the amount of the luminous flux of the second laser light beam in different time intervals, so that the illumination light beam has a good color performance. Moreover, in the embodiment, since the first laser element and the second laser element are simultaneously turned on to operate, they are both adapted to provide blue laser light beam or to excite the wavelength conversion material, thereby reducing a total number of the laser elements required for the illumination system, and reducing the cost. Moreover, since the total number of the laser elements is reduced, it avails cooling of the projection apparatus. Moreover, since the first laser element and the second laser element are all disposed in the laser light source module, and has the same optical path, a design of the optical path is relatively simple, and an overall device size is also reduced. In addition, since the second laser light beam with the short wavelength is relatively purple in human vision, by mixing it with the first laser light beam with the long wavelength, a problem of blue light purple-biased is mitigated, so as to achieve a good color performance of the illumination beam. Moreover, the illumination control method of the embodiment of the invention is capable of easily adjusting the illumination light beam in the aforementioned illumination system and the projection apparatus, so as to control the amount of luminous flux of the first laser light beam and the amount of luminous flux of the second laser light beam in different time intervals, thereby achieving good color performance of the illumination beam.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
    a laser light source module, configured to simultaneously emit a first laser light beam and a second laser light beam, wherein a peak wavelength of the first laser light beam is greater than a peak wavelength of the second laser light beam;
    a wavelength conversion module, located on a transmission path of the first laser light beam and the second laser light beam, and having at least one wavelength conversion region and a reflection region; and
    a control module, electrically connected to the laser light source module and the wavelength conversion module, respectively, wherein in a first time interval, the control module controls an amount of luminous flux of the first laser light beam to be greater than an amount of luminous flux of the second laser light beam, and in a second time interval, the control module controls the amount of luminous flux of the first laser light beam to be smaller than the amount of luminous flux of the second laser light beam, wherein the first time interval is a time interval when the reflection region of the wavelength conversion module is cut into the transmission path of the first laser light beam and the second laser light beam, and the second time interval is a time interval when the at least one wavelength conversion region of the wavelength conversion module is cut into the transmission path of the first laser light beam and the second laser light beam.

2. The illumination system as claimed in claim 1, wherein the laser light source module comprises at least one first laser element and at least one second laser element, wherein the at least one first laser element is configured to emit the first laser light beam, the at least one second laser element is configured to emit the second laser light beam, and a difference between the peak wavelength of the first laser light beam and the peak wavelength of the second laser light beam is smaller than 30 nm.

3. The illumination system as claimed in claim 2, wherein in the first time interval, the control module controls a current provided to the at least one first laser element to be greater than a current provided to the at least one second laser element, and in the second time interval, the control module controls the current provided to the at least one first laser element to be smaller than the current provided to the at least one second laser element.

4. The illumination system as claimed in claim 2, wherein in the first time interval, the control module controls a duty ratio of the at least one first laser element to be greater than a duty ratio of the at least one second laser element, and in the second time interval, the control module controls the duty ratio of the at least one first laser element to be smaller than the duty ratio of the at least one second laser element.

5. The illumination system as claimed in claim 2, wherein the number of the at least one first laser element and the number of the at least one second laser element are both plural, and in the first time interval, the number of the first laser elements controlled to be in a turn-on state by the control module is greater than the number of the second laser elements in the turn-on state, and in the second time interval, the number of the first laser elements controlled to be in the turn-on state by the control module is smaller than the number of the second laser elements in the turn-on state.

6. The illumination system as claimed in claim 1, further comprising:
    an auxiliary light source, configured to provide an auxiliary light beam, wherein a peak wavelength of the auxiliary light beam is different to the peak wavelength of the first laser light beam and the peak wavelength of the second laser light beam, wherein the auxiliary light source provides the auxiliary light beam in a third time interval, wherein the third time interval is not overlapped with the first time interval and the second time interval, and in the third time interval, the control module turns off the laser light source module.

7. The illumination system as claimed in claim 1, further comprising:
    an auxiliary light source, configured to provide an auxiliary light beam, wherein a peak wavelength of the auxiliary light beam is different to the peak wavelength of the first laser light beam and the peak wavelength of the second laser light beam, wherein the auxiliary light source provides the auxiliary light beam in a third time interval, and the third time interval is overlapped with the first time interval and the second time interval.

8. The illumination system as claimed in claim 1, further comprising:
    a first light-splitting element, located between the laser light source module and the wavelength conversion module, and having a first region and a second region, wherein the first laser light beam and the second laser light beam are simultaneously transmitted to the wavelength conversion module through the first region of the first light-splitting element.

9. The illumination system as claimed in claim 8, further comprising:
    a light converging lens, located between the first light-splitting element and the wavelength conversion module, wherein the first laser light beam and the second laser light beam eccentrically pass through the light converging module CL1 to be incident to the wavelength conversion module through the light converging module, and in the first time interval, the first laser light beam and the second laser light beam are reflected by the reflection region of the wavelength conversion module and transmitted to the second region of the first light-splitting element through the light converging element.

10. The illumination system as claimed in claim 8, further comprising:
    a light transmitting element, located on a transmission path of the first laser light beam and the second laser light beam coming from the reflection region of the wavelength conversion module, wherein the second region of the first light-splitting element is located between the wavelength conversion module and the light transmitting element, a part of the first laser light beam and the second laser light beam is reflected by the second region, and another part of the first laser light beam and the second laser light beam pass through the second region and is transmitted to the light transmitting element, and the another part of the first laser light beam and the second laser light beam passing through the second region is reflected by the light transmitting element.

11. A projection apparatus, comprising:
an illumination system, configured to provide an illumination light beam, and comprising:
    a laser light source module, configured to simultaneously emit a first laser light beam and a second laser light beam, wherein a peak wavelength of the first laser light beam is greater than a peak wavelength of the second laser light beam;
    a wavelength conversion module, located on a transmission path of the first laser light beam and the second laser light beam, and having at least one wavelength conversion region and a reflection region; and
    a control module, electrically connected to the laser light source module and the wavelength conversion module, respectively, wherein in a first time interval, the control module controls an amount of luminous flux of the first laser light beam to be greater than an amount of luminous flux of the second laser light beam, and in a second time interval, the control module controls the amount of luminous flux of the first laser light beam to be smaller than the amount of luminous flux of the second laser light beam, wherein the first time interval is a time interval when the reflection region of the wavelength conversion module is cut into the transmission path of the first laser light beam and the second laser light beam, and the second time interval is a time interval when the at least one wavelength conversion region of the wavelength conversion module is cut into the transmission path of the first laser light beam and the second laser light beam;
at least one light valve, located on a transmission path of the illumination light beam, and configured to convert the illumination light beam into an image beam; and
a projection lens, located on a transmission path of the image beam, and configured to project the image beam to form a projection beam.

12. The projection apparatus as claimed in claim 11, wherein the laser light source module comprises at least one first laser element and at least one second laser element, wherein the at least one first laser element is configured to emit the first laser light beam, the at least one second laser element is configured to emit the second laser light beam, and a difference between the peak wavelength of the first laser light beam and the peak wavelength of the second laser light beam is smaller than 30 nm.

13. The projection apparatus as claimed in claim 12, wherein in the first time interval, the control module controls a current provided to the at least one first laser element to be greater than a current provided to the at least one second laser element, and in the second time interval, the control module controls the current provided to the at least one first laser element to be smaller than the current provided to the at least one second laser element.

14. The projection apparatus as claimed in claim 12, wherein in the first time interval, the control module controls a duty ratio of the at least one first laser element to be greater than a duty ratio of the at least one second laser element, and in the second time interval, the control module controls the duty ratio of the at least one first laser element to be smaller than the duty ratio of the at least one second laser element.

15. The projection apparatus as claimed in claim 12, wherein the number of the at least one first laser element and the number of the at least one second laser element are both plural, and in the first time interval, the number of the first laser elements controlled to be in a turn-on state by the control module is greater than the number of the second laser elements in the turn-on state, and in the second time interval, the number of the first laser elements controlled to be in the turn-on state by the control module is smaller than the number of the second laser elements in the turn-on state.

16. The projection apparatus as claimed in claim 11, wherein the illumination system further comprises:
    an auxiliary light source, configured to provide an auxiliary light beam, wherein a peak wavelength of the auxiliary light beam is different to the peak wavelength of the first laser light beam and the peak wavelength of the second laser light beam, wherein the auxiliary light source provides the auxiliary light beam in a third time interval, wherein the third time interval is not overlapped with the first time interval and the second time interval, and in the third time interval, the control module turns off the laser light source module.

17. The projection apparatus as claimed in claim 11, further comprising:
    an auxiliary light source, configured to provide an auxiliary light beam, wherein a peak wavelength of the auxiliary light beam is different to the peak wavelength of the first laser light beam and the peak wavelength of the second laser light beam, wherein the auxiliary light source provides the auxiliary light beam in a third time interval, and the third time interval is overlapped with the first time interval and the second time interval.

18. An illumination control method, adapted to control an illumination system of a projection apparatus, wherein the illumination system comprises a laser light source module and a wavelength conversion module, and the wavelength conversion module has at least one wavelength conversion region and a reflection region, the illumination control method comprising:
    simultaneously emitting a first laser light beam and a second laser light beam by the laser light source module, wherein the wavelength conversion module is located on a transmission path of the first laser light beam and the second laser light beam, and a peak wavelength of the first laser light beam is greater than a peak wavelength of the second laser light beam;
    in a first time interval, controlling an amount of luminous flux of the first laser light beam to be greater than an amount of luminous flux of the second laser light beam, wherein the first time interval is a time interval when the reflection region of the wavelength conversion module is cut into the transmission path of the first laser light beam and the second laser light beam; and
    in a second time interval, controlling the amount of luminous flux of the first laser light beam to be smaller than the amount of luminous flux of the second laser light beam, wherein the second time interval is a time interval when the at least one wavelength conversion region of the wavelength conversion module is cut into the transmission path of the first laser light beam and the second laser light beam.

19. The illumination control method as claimed in claim 18, wherein the laser light source module comprises at least one first laser element and at least one second laser element, wherein the at least one first laser element is configured to emit the first laser light beam, the at least one second laser element is configured to emit the second laser light beam, and the illumination control method further comprises:

in the first time interval, controlling a current provided to the at least one first laser element to be greater than a current provided to the at least one second laser element; and in the second time interval, controlling the current provided to the at least one first laser element to be smaller than the current provided to the at least one second laser element.

20. The illumination control method as claimed in claim 18, wherein the laser light source module comprises at least one first laser element and at least one second laser element, wherein the at least one first laser element is configured to emit the first laser light beam, the at least one second laser element is configured to emit the second laser light beam, and the illumination control method further comprises:

in the first time interval, controlling a duty ratio of the at least one first laser element to be greater than a duty ratio of the at least one second laser element; and in the second time interval, controlling the duty ratio of the at least one first laser element to be smaller than the duty ratio of the at least one second laser element.

21. The illumination control method as claimed in claim 18, wherein the laser light source module comprises a plurality of first laser elements and a plurality of second laser elements, wherein the first laser elements are configured to emit the first laser light beam, the second laser elements are configured to emit the second laser light beam, and the illumination control method further comprises:

in the first time interval, controlling the number of the first laser elements in a turn-on state to be greater than the number of the second laser elements in the turn-on state; and in the second time interval, controlling the number of the first laser elements in the turn-on state to be smaller than the number of the second laser elements in the turn-on state.

22. The illumination control method as claimed in claim 18, wherein the illumination system further comprises an auxiliary light source, and the illumination control method further comprises:

providing an auxiliary light beam by the auxiliary light source in a third time interval, wherein the third time interval is not overlapped with the first time interval and the second time interval, and a peak wavelength of the auxiliary light beam is different to the peak wavelength of the first laser light beam and the peak wavelength of the second laser light beam; and in the third time interval, turning off the laser light source module.

23. The illumination control method as claimed in claim 18, wherein the illumination system further comprises an auxiliary light source, and the illumination control method further comprises:

providing an auxiliary light beam by the auxiliary light source in a third time interval, wherein the third time interval is overlapped with the first time interval and the second time interval, a peak wavelength of the auxiliary light beam is different to the peak wavelength of the first laser light beam and the peak wavelength of the second laser light beam.

* * * * *